(12) United States Patent
Sakamaki et al.

(10) Patent No.: US 6,584,515 B1
(45) Date of Patent: Jun. 24, 2003

(54) NC CONTROLLING SYSTEM WITH INDEPENDENT PROGRAMS FOR APPENDED EQUIPMENT

(75) Inventors: Kazuo Sakamaki, Ojiya (JP); Akira Sakamaki, Ojiya (JP); Kiyohiro Kinefuchi, Ojiya (JP)

(73) Assignee: Yukiwa Seiko Kabushiki Kaisha, Niigata-ken (JP)

( * ) Notice: Subject to any disclaimer, the term of this patent is extended or adjusted under 35 U.S.C. 154(b) by 430 days.

(21) Appl. No.: 09/586,782

(22) Filed: Jun. 5, 2000

(51) Int. Cl.$^7$ ................................................. G06F 3/00
(52) U.S. Cl. ........................... 710/29; 712/225; 700/86; 700/187; 700/571
(58) Field of Search ................................. 712/220, 225; 710/1, 36, 62, 64, 29, 5; 700/187, 86, 569, 570, 571, 572, 265, 186, 189

(56) References Cited

U.S. PATENT DOCUMENTS

| | | | | |
|---|---|---|---|---|
| 4,281,379 A | * | 7/1981 | Austin | 364/102 |
| 4,550,375 A | * | 10/1985 | Sato et al. | 700/168 |
| 4,703,441 A | * | 10/1987 | Kishi et al. | 345/530 |
| 4,821,201 A | * | 4/1989 | Kawamura et al. | 700/160 |
| 5,005,134 A | * | 4/1991 | Nakashima et al. | 700/157 |
| 5,194,793 A | * | 3/1993 | Niimi | 318/568.15 |
| 6,192,297 B1 | * | 2/2001 | Marobin | 700/245 |
| 6,223,095 B1 | * | 4/2001 | Yamazaki et al. | 700/187 |
| 6,437,534 B1 | * | 8/2002 | Kakino et al. | 318/569 |

* cited by examiner

Primary Examiner—Jeffrey Gaffin
Assistant Examiner—Rijue Mai
(74) Attorney, Agent, or Firm—Connolly Bove Lodge & Hutz LLP

(57) ABSTRACT

To provide an NC controlling system that is superior in practical use and workability and that may perform an administration of inputting, compiling and storing a control program of a NC machine tool and a control program of an appended equipment together as one program in a NC controlling apparatus, an NC controlling system having an NC machine tool provided with a control program and appended equipment used together with the machine tool to be numerically controlled, wherein a control program of the appended equipment is written in an annotation part of the control program of the NC machine tool, and a reading unit is provided for identifying and reading the control program of the appended equipment written in the annotation part of the control program of the NC machine tool.

9 Claims, 2 Drawing Sheets

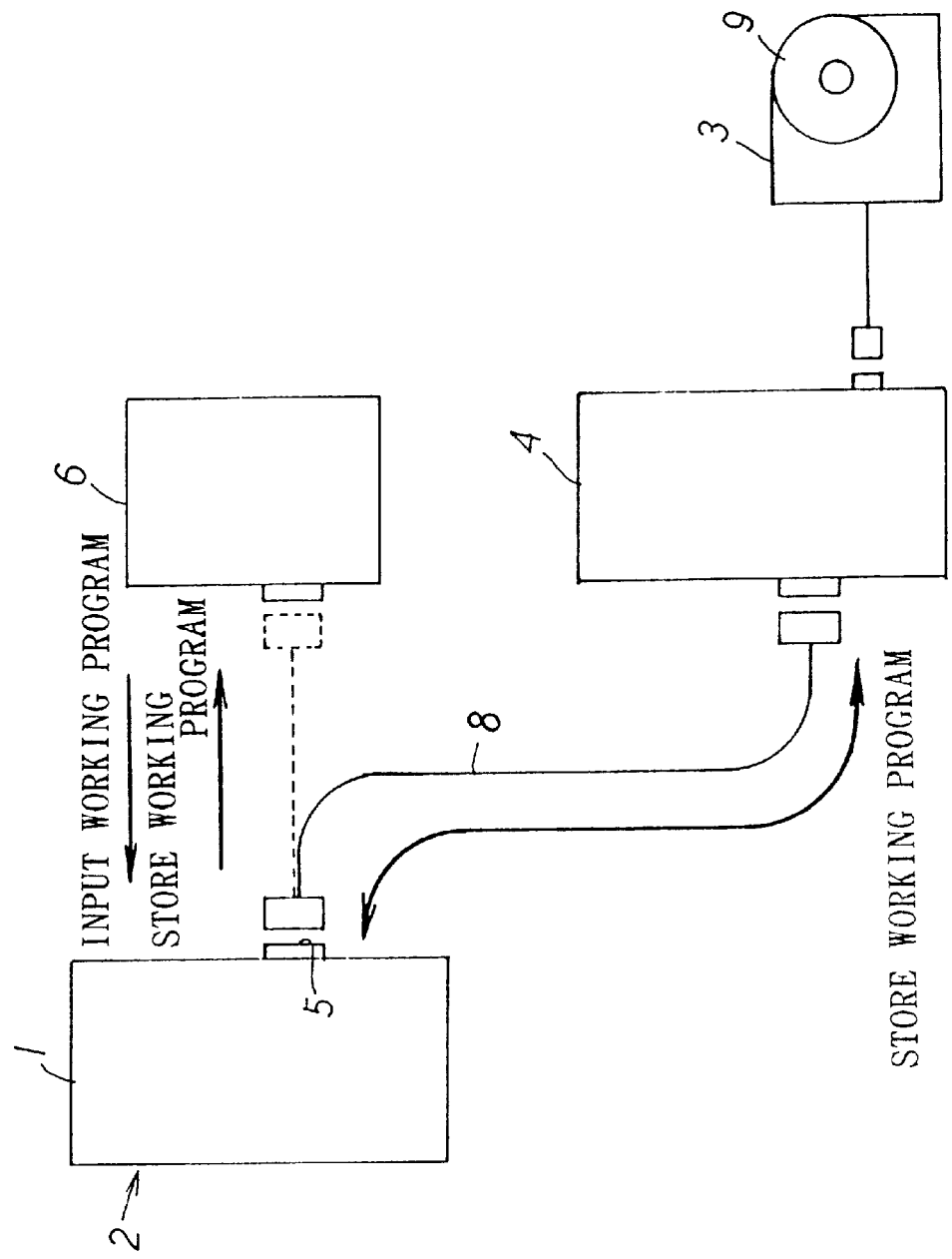

NC CONTROLLING SYSTEM WITH INDEPENDENT PROGRAMS FOR APPENDED EQUIPMENT

BACKGROUND OF THE INVENTION

The present invention relates to an NC controlling system for controlling peripheral equipment appended to an NC machine tool.

In an NC machine tool, the operation of the NC machine tool and the operation of equipment appended to the NC machine tool have to cooperate with each other. For instance, in case of the operation of a NC circular table installed in a table of the NC machine tool for performing the rotation and indexing of a workpiece (hereinafter referred to as an NC circular table), the operation of a tool, a table or the like of the NC machine tool has to be performed in cooperation with the operation of the rotary table of the NC circular table.

By the way, such an NC machine tool and an NC controlling system for controlling the NC circular table are categorized into the following two types:

i) One for writing a control program of the NC circular table to a controlling program of the NC machine tool and directly controlling the NC circular table in accordance with the controlling program; and ii) One for providing control programs for the NC machine tool and the NC circular table, respectively, for controlling the NC circular table in accordance with an NC controlling signal issued from the NC machine tool (i.e., so-called M-signals, a pair of contact signals of a start signal and an end signal), that is, one for cooperating the control program of the NC circular table with the control program of the NC machine tool.

Currently, in many cases, the NC machine tool has no function to directly control the NC circular table in accordance with the control program of the NC machine tool as in the above-described type i) and the above-described type ii) of the NC controlling system with a high versatility has been widely used.

However, the type ii) of the NC controlling system suffers from the following problems. Namely, since the administration such as inputting, compiling, storing or the like is effected separately to the NC machine tool and the NC circular table, respectively, and the control programs of the NC machine tool and the NC circular table are caused to cooperate with each other, if there is an error in inputting, compiling, storing or the like of the control program on one side, due to the difference in program between the two, it is impossible to effect the exact working operation.

Accordingly, in the art, there is a demand to solve the above-noted defects.

SUMMARY OF THE INVENTION

In order to meet the above-described demand, an object of the present invention is to provide an NC controlling system that may use an annotation part of the controlling program of the NC machine tool as a control program for appended equipment.

According to the present invention, there is provided an NC controlling system comprising an NC machine tool provided with a control program and appended equipment used together with the machine tool to be numerically controlled, wherein a control program of the appended equipment is written in an annotation part of the control program of the NC machine tool, and a reading unit is provided for identifying and reading the control program of the appended equipment written in the annotation part of the control program of the NC machine tool.

In the NC controlling system, the appended equipment has a controller for numerically controlling the appended equipment, and the reading unit is provided in the controller for identifying and reading the control program of the appended equipment written in the annotation part of the control program of the NC machine tool.

In the NC controlling system, a start letter row for identifying the control program of the appended equipment by the reading unit is written in the annotation part of the program for controlling the NC machine tool.

In the NC controlling system, an NC circular table is used as the appended equipment.

Also, according to another aspect of the present invention, there is provided an NC controlling system comprising an NC machine tool that may output and input a control program provided in an NC controlling apparatus to an outside input/output unit through an interface, an NC circular table used together with the NC machine tool to be numerically controlled and a controller for imputing a control program of the NC circular table to the NC circular table, wherein a control program of NC circular table is written in an annotation part of the control program of the NC machine tool, a reading unit is provided in the controller for identifying and reading the control program of the NC circular table written in the annotation part of the control program of the NC machine tool, a control program of the NC circular table written in the annotation part is read out of a control program of the NC machine tool outputted through the interface of the NC machine tool by the controller, and the NC circular table is operated by the control of the controller and control signals out of the NC machine tool.

The control program of the appended equipment is written in the annotation part of the control program of the NC machine tool. The control program of the appended equipment is read out by, for example, the reading unit provided in the controller for controlling the appended equipment. The appended equipment may be operated in accordance with the control program of the appended equipment.

Since the NC machine tool disregards the annotation part as meaningless information, there is no fear that the control program of the appended equipment written in the annotation part adversely affects the operation of the machine tool.

With such an arrangement according to the present invention, it is possible to provide an NC controlling system that is superior in practical use and workability and that may perform the administration of inputting, compiling and storing the control program of the NC machine tool and the control program of the appended equipment together as one program in the NC controlling apparatus.

BRIEF DESCRIPTION OF THE DRAWINGS

In the accompanying drawings:

FIG. 2 is an illustration of the NC controlling system shown in FIG. 1.

DESCRIPTION OF THE PREFERRED EMBODIMENTS

Figure 1:
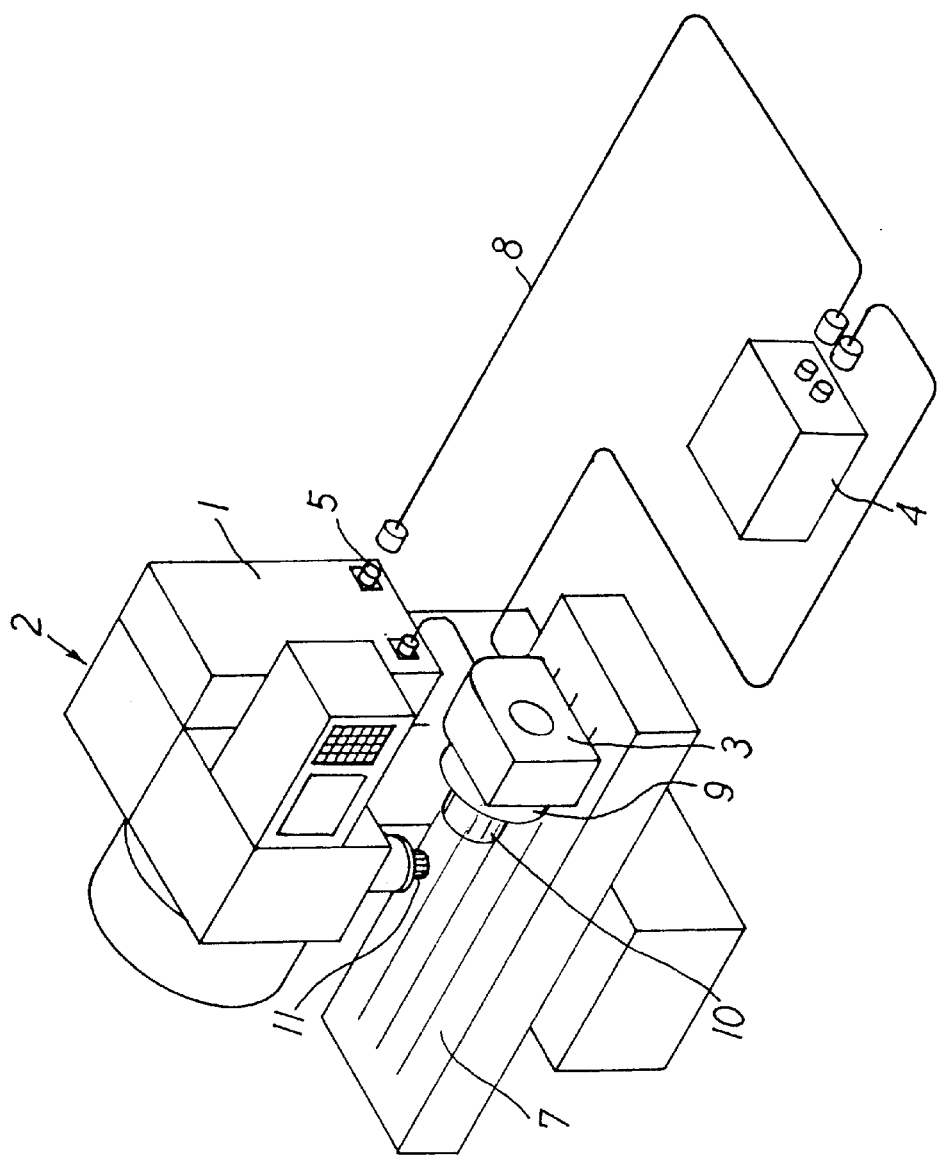
FIG. 1 is a schematic perspective view of an NC controlling system in accordance with an embodiment of the invention.

An embodiment of the present invention will now be described with reference to the accompanying drawings.

An NC controlling system in accordance with this embodiment includes an NC machine tool 2 for inputting and outputting a control program provided in an NC control unit 1 to an outside input/output unit 6 through an interface 5, an NC circular table 3 used together with the NC machine tool 2 to be numerically controlled, and a controller 4 for inputting a control program of the NC circular table 3 to the NC circular table 3. The control program for the NC circular table 3 is written in an annotation part of the control program of the above-described NC machine tool 2. The controller 4 has a reading unit for recognizing and reading the control program for the NC circular table 3 written in the annotation part of the control program of the NC machine tool 2. The controller 4 reads out the control program of the NC circular table 3 written in the annotation part out of the control program of the NC machine tool 2 outputted through the interface 5 of the above-described NC machine tool 2. As a result, the NC circular table 3 is to be controlled by the above-described controller 4 and control signals from the NC machine tool 2.

In general, the annotation part may be provided in the program of the NC control unit 1 for controlling the NC machine tool 2. In general, a code of CONTROL OUT is used for the start of the annotation part ("(" in terms of ISO codes) and a code of CONTROL IN is used for the end of the annotation part (")" in terms of ISO codes). The information inputted between the code of CONTROL OUT and the code of CONTROL IN is all regarded as the annotation part.

In a normal NC machine tool 2, the annotation part may perform the operation such as compiling, storing, and inputting/outputting with the outside input/output unit 6 but such operation is disregarded as meaningless information for operation of NC machine tool 2.

The control program of the NC circular table 3 that may operate the NC circular table 3 is inputted into this annotation part. Furthermore, a start letter row that may recognize the control program of the NC circular table 3 by the reading unit and starting the readout is added to the annotation part. An identification letter row that may identify and read the program of the NC circular table 3 written in the annotation part of the control program of the NC machine tool 2 in accordance with the above-described start letter row is inputted into the reading unit of the controller 4 as the parameter.

When the controller 4 is connected to the NC controlling unit 1 of the NC machine tool 2 and the NC circular table 3 through the interface 5 and the control program of the NC controlling unit 1 is read by the reading unit of the controller 4, the reading unit of the controller 4 reads out the control program of the NC circular table 3 written in the annotation part in the program, i.e., the program to which the start letter row has been added. Incidentally, the interface 5 is provided to the standard NC controlling apparatus 1 for the purpose of inputting the program from the outside by the outside input/output unit 6 or outputting and storing the program to the outside input/output unit 6.

The readout operation of the program to the controller 4 is ended in accordance with the code of CONTROL IN of the annotation part. Also, the end letter row for instructing the completion of the readout operation of the control program of the NC circular table 3 is inputted before the code of CONTROL IN, and on the other hand, the end identification letter row for ending the readout operation of the program in accordance with the end letter row is inputted into the reading unit of the controller 4 as the parameter. In accordance with the end letter row and the end identification letter row, it is possible to end the readout operation of the program by the reading unit of the controller 4.

The control program of the NC circular table 3 that has been read by the controller 4 is present in the controller 4. When the workpiece 10 is mounted on the NC circular table 3 and worked, the NC circular table 3 is operated in accordance with the NC control signal (M-signals described in conjunction with the prior art) to be issued from the NC controlling apparatus 1 of the NC machine tool 2 and the control program of the NC circular table 3 that is present in the controller 4, thereby perform the working operation.

In the drawings, reference numeral 7 denotes a table, reference numeral 8 denotes a cable, numeral 9 denotes a rotary table and numeral 11 denotes a tool for working the workpiece 10.

One example of the program is given as follows. In this program, "##1" denotes the start letter row, and the readout operation of the control program of the NC circular table 3 to the controller 4 is started from "##1". Also, the end of the readout of the control program of the NC circular table 3 is performed by ")".

| | |
|---|---|
| % | |
| (INDEX TEST SAMPLE): | annotation part |
| 00001: | program number |
| (##1 N00 A0; N01 A90.000; N02 A180.000; N02 J0;) | annotation part used as the control program of the NC circular table 3 |
| C90 G0 X0 Y0 Z500.000: | positioning tool 11 of the NC machine tool 2 |
| M70: | rotation of the rotary table 9, return to the original point |
| X-123.000 Y45.000: | positioning the tool 11 of the NC machine tool 2 |
| M70: | rotation of the rotary table 9, 90° forward rotation |
| Z-50.000: | positioning of the tool 11 of the NC machine tool 2 |
| M70: | rotation of the rotary table 9, 180° forward rotation |
| M30: | rewind stop |
| % | |

With such an arrangement, it is possible to administrate the operation such as inputting, compiling, storing or the like for the control program of the NC machine tool 2 and the control program of the NC circular table 3 as one program in the NC controlling apparatus 1 of the NC machine tool 2 together. Thus, it is possible to provide the NC controlling system that is superior in practical use and workability which may operate the NC circular table 3 in accordance with the control program of the NC circular table 3 while reading out only the control program of the NC circular table 3 of the whole program to the controller 4.

Also, since it is possible to perform the administration operation such as inputting, compiling, storing or the like together as one program in the NC controlling apparatus 1, it is possible to perform together the compile operation and confirm of the control program of the NC machine tool 2 and the control program of the NC circular table 3 on a screen of a display unit such as a CRT of the operating board of the NC controlling apparatus 1. Thus, it is possible to provide the NC controlling system that is superior in practical use and workability for making it possible to prevent an input mistake or a confirmation mistake that is likely to occur in the case where the NC controlling apparatus 1 of the NC machine tool 2 and the controller 4 of the NC circular table 3 are located far away from each other.

Also, with respect to the annotation part which has no start letter row, since it is disregarded by the NC machine tool 2 and the controller 4 (NC circular table 3), there is no adverse affect against the portion as an inherent annotation part at all, it is possible to perform the administration operation such as inputting, compiling, storing or the like of the control program of the NC circular table 3 in the NC controlling apparatus 1 of the NC machine tool 2. Also, the control program of a different kind of a NC circular table 3 or other appended peripheral equipment is written in the control program of the NC machine tool 2, and the start letter row is added or not added, whereby it is possible to set the readout by the reading unit to be possible or disabled. It is therefore possible to provide an NC control system that is further superior in practical use.

Since the control program of the NC circular table 3 may be read into the reading unit of the controller 4 by utilizing the interface for connecting the NC controlling apparatus 1 and the outside input/output unit 6, it is possible to effectively utilize the interface 5. At the same time, the program inputted, compiled and stored by the outside input/output unit 6 may be once read into the controller 4 through the NC controlling apparatus 1 or read directly into the controller 4 from the outside input/output unit 6. It is therefore possible to concentratedly administrate the NC equipment such as the NC machine tools 2, or the NC circular tables 3 or any other appended equipment of the factor as a whole. It is therefore possible to provide an NC control system that is further superior in practical use and workability.

Incidentally, the NC circular table 3 according to this embodiment includes a concept of an NC circular table and an NC tilting table.

Also, a serial interface such as RS232C is mainly used as the interface 5 provided to the NC controlling apparatus 1. However, in the same way, it is possible to use the controller 4 in accordance with this embodiment for the NC controlling apparatus 1 using a parallel interface.

Also, the concept of the control program generally means one for reading the working program for working the workpiece 10, displaying on the screen, rotating a motor or the like but includes one for controlling the work or machining of the workpiece in this embodiment.

What is claimed is:

1. An NC controlling system comprising an NC machine tool provided with a program and appended equipment used together with the NC machine tool to be numerically controlled, wherein a program of the appended equipment is written in an annotation part of the program of said NC machine tool, said NC machine tool ignores the program of the appended equipment written in said annotation part of the program of said NC machine tool, and a reading unit is provided for identifying and reading the program of the appended equipment written in the annotation part of the program of said NC machine tool.

2. The NC controlling system according to claim 1, wherein said appended equipment has a controller for numerically controlling said appended equipment, and said reading unit is provided in said controller for identifying and reading the program of the appended equipment written in the annotation part of the program of said NC machine tool.

3. The NC controlling system according to claim 1, wherein a start letter row for identifying the program of said appended equipment by the reading unit is written in the annotation part of the program for controlling the NC machine tool.

4. The NC controlling system according to claim 2, wherein a start letter row for identifying the program of said appended equipment by the reading unit is written in the annotation part of the program for controlling the NC machine tool.

5. The NC controlling system according to claim 1, wherein an NC circular table is used as said appended equipment.

6. The NC controlling system according to claim 2, wherein an NC circular table is used as said appended equipment.

7. The NC controlling system according to claim 3, wherein an NC circular table is used as said appended equipment.

8. The NC controlling system according to claim 4, wherein an NC circular table is used as said appended equipment.

9. An NC controlling system comprising:

an NC machine tool that may output and input a program provided in an NC controlling apparatus to an outside input/output unit through an interface;

an NC circular table used together with said NC machine tool to be numerically controlled; and a controller for inputting a program of said NC circular table to said NC circular table, wherein a program of the NC circular table is written in an annotation part of the program of said NC machine tool, said NC machine tool ignores the program of the NC circular table written in said annotation part of the program of said NC machine tool, a reading unit is provided in said controller for identifying and reading the program of the NC circular table written in the annotation part of the program of said NC machine tool, the program of said NC circular table written in the annotation part is read out of the program of said NC machine tool outputted through the interface of said NC machine tool by said controller, and said NC circular table is operated by the control of said controller and control signals out of said NC machine tool.

* * * * *